United States Patent
Vessot et al.

(10) Patent No.: US 10,814,989 B2
(45) Date of Patent: Oct. 27, 2020

(54) PROPULSION ASSEMBLY FOR AN AIRCRAFT, COMPRISING A GAS GENERATOR, TWO OFFSET FANS AND AN AIR INLET SLEEVE

(71) Applicant: SAFRAN AIRCRAFT ENGINES, Paris (FR)

(72) Inventors: Christian Sylvain Vessot, Paris (FR); Bruno Albert Beutin, Evry (FR); Philippe Gérard Chanez, Paris (FR); Mathieu Patrick Jean-Louis Lallia, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 537 days.

(21) Appl. No.: 15/349,675

(22) Filed: Nov. 11, 2016

(65) Prior Publication Data

US 2017/0137134 A1 May 18, 2017

(30) Foreign Application Priority Data

Nov. 13, 2015 (FR) .................................... 15 60895

(51) Int. Cl.
*B64D 27/12* (2006.01)
*F02K 3/12* (2006.01)
(Continued)

(52) U.S. Cl.
CPC ............. *B64D 27/12* (2013.01); *B64D 29/02* (2013.01); *B64D 33/02* (2013.01); *B64D 35/04* (2013.01);
(Continued)

(58) Field of Classification Search
CPC ...... B64D 2033/022; B64D 2033/0246; B64D 2033/0286; B64D 27/12; B64D 2027/026;
(Continued)

(56) References Cited

U.S. PATENT DOCUMENTS 2,025,033 A * 12/1935 Atwood ................. B64D 27/00
244/13
2,601,194 A * 6/1952 Whittle ..................... F02K 3/12
60/262
(Continued)

FOREIGN PATENT DOCUMENTS

| EP | 2096293 A2 | 9/2009 |
|---|---|---|
| EP | 2824284 A1 | 1/2015 |
| WO | 2014/109811 A2 | 7/2014 |

OTHER PUBLICATIONS

Rapport de Recherche Preliminaire, dated Jul. 8, 2016, issued in corresponding French Application No. 1560895 filed Nov. 13, 2015, 2 pages.

*Primary Examiner* — Medhat Badawi
(74) *Attorney, Agent, or Firm* — Christensen O'Connor Johnson Kindness PLLC

(57) ABSTRACT

An aircraft propulsion assembly, comprising a gas generator and two fans rotated by the gas generator and offset on either side of a vertical plane passing through the axis of said gas generator. The propulsion assembly comprises an air inlet sleeve comprising an inlet pipe oriented along a first axis that is substantially parallel and offset with respect to a longitudinal axis of the gas generator, the inlet pipe dividing into a supply pipe that is connected to an inlet opening of the gas generator and a discharge pipe configured such that particles ingested by the inlet pipe are discharged without entering the gas generator.

15 Claims, 4 Drawing Sheets

(51) Int. Cl.
*F02C 7/052* (2006.01)
*F01D 13/00* (2006.01)
*B64D 35/04* (2006.01)
*B64D 29/02* (2006.01)
*B64D 33/02* (2006.01)

(52) U.S. Cl.
CPC .............. *F01D 13/00* (2013.01); *F02C 7/052* (2013.01); *F02K 3/12* (2013.01); *B64D 2033/022* (2013.01); *B64D 2033/0246* (2013.01); *B64D 2033/0286* (2013.01); *F05D 2220/323* (2013.01); *F05D 2250/312* (2013.01); *F05D 2260/607* (2013.01); *Y02T 50/672* (2013.01); *Y02T 50/675* (2013.01)

(58) Field of Classification Search
CPC ........ B64D 29/02; B64D 33/02; B64D 35/04; F01D 13/00; F02C 7/052; F02C 7/36; F02K 3/12; F02K 3/072; F02K 3/077; F05D 2220/323; F05D 2250/312; F05D 2260/607; Y02T 50/672; Y02T 50/675
See application file for complete search history.

(56) References Cited

U.S. PATENT DOCUMENTS

| | | | | |
|---|---|---|---|---|
| 2,988,301 A * | 6/1961 | Fletcher | .............. | B64C 29/0025 244/12.3 |
| 3,054,577 A * | 9/1962 | Wolf | ........................ | F02K 3/062 60/226.1 |
| 3,161,374 A * | 12/1964 | Allred | ................ | B64C 29/0025 244/12.3 |
| 3,179,354 A * | 4/1965 | Alvarez-Calderon | ........................ | B64C 23/00 244/12.4 |
| 3,547,380 A * | 12/1970 | Kappus | .................. | B64D 27/26 376/318 |
| 3,938,328 A * | 2/1976 | Klees | ........................ | F02K 3/04 60/262 |
| 4,254,619 A * | 3/1981 | Giffin, III | ............... | F02K 3/075 244/55 |
| 4,456,204 A * | 6/1984 | Hapke | .................... | B64D 27/20 244/53 R |
| 4,500,055 A * | 2/1985 | Krojer | .................... | B64D 27/14 244/55 |
| 6,260,800 B1 * | 7/2001 | Snell | ........................ | B64C 3/50 244/53 R |
| H2032 H * | 7/2002 | DiPietro, Jr. | ................. | 60/226.1 |
| 6,477,829 B1 * | 11/2002 | Hunter | ...................... | F02K 3/00 60/225 |
| 7,107,755 B2 * | 9/2006 | El Hamel | ............. | B64C 11/001 244/55 |
| 7,107,756 B2 * | 9/2006 | Rolt | .......................... | F02K 3/06 60/224 |
| 7,581,694 B2 * | 9/2009 | Guering | ................. | B64D 27/14 244/53 B |
| 7,752,834 B2 * | 7/2010 | Addis | ..................... | B64D 27/10 244/60 |
| 7,819,358 B2 * | 10/2010 | Belleville | ............. | B64C 11/001 244/52 |
| 7,874,513 B1 * | 1/2011 | Smith | .................... | B64C 11/001 244/12.4 |
| 7,926,760 B2 * | 4/2011 | Gall | .......................... | B64C 3/10 244/1 N |
| 8,011,613 B2 * | 9/2011 | Belleville | .............. | B64D 27/14 244/1 N |
| 8,015,796 B2 * | 9/2011 | Babu | ..................... | F01D 13/003 60/226.1 |
| 9,346,551 B2 * | 5/2016 | Stretton | ................. | B64D 27/14 |
| 9,650,954 B2 * | 5/2017 | Suciu | ........................ | F02C 3/06 |
| 9,828,911 B2 * | 11/2017 | Burghardt | ................. | F02C 3/10 |
| 10,006,361 B2 * | 6/2018 | Bailey Noval | ......... | F02C 3/107 |
| 10,024,235 B2 * | 7/2018 | Suciu | ........................ | F02C 3/14 |
| 2004/0025493 A1 * | 2/2004 | Wojciechowski | ........ | F02K 3/06 60/224 |
| 2006/0011780 A1 * | 1/2006 | Brand | .................... | B64D 27/14 244/60 |
| 2007/0284005 A1 * | 12/2007 | Brunet | .................. | B64D 33/04 137/561 A |
| 2009/0229243 A1 * | 9/2009 | Guemmer | ............. | B64D 27/12 60/226.1 |
| 2014/0119903 A1 * | 5/2014 | Suciu | ...................... | F02C 7/052 415/177 |
| 2014/0260183 A1 * | 9/2014 | Suciu | ...................... | F02C 7/057 60/225 |
| 2015/0013307 A1 | 1/2015 | Burghardt | | |

* cited by examiner

PROPULSION ASSEMBLY FOR AN AIRCRAFT, COMPRISING A GAS GENERATOR, TWO OFFSET FANS AND AN AIR INLET SLEEVE

FIELD OF THE DISCLOSURE

Embodiments of the present invention relate to the aeronautical field and a propulsion assembly comprising at least two fans driven by a gas generator.

BACKGROUND OF THE DISCLOSURE

Novel propulsion assembly architectures comprising at least two fans offset with respect to a gas generator, usually under the wings of an aircraft, have been proposed in order to optimize the propulsion efficiency by means of a high bypass ratio (BPR) while keeping an acceptable ground clearance and fans of small size. The bypass ratio is the ratio between the flow rates of the secondary flow or cold flow passing through the fan or fans to generate a thrust and a primary flow or hot flow passing through the gas generator. Such an architecture provides for the fans and the gas generator each to be arranged in casings that more or less abut each other. These casings are extended downstream with reference to the flow of the gases in the propulsion assembly and the casing of the gas generator is arranged so as to straddle the fan casings. Such architectures are known from EP-A2-2096293 and EP-A1-2824284, WO-A2-2014/109811 and US 2014/260183.

Because of the offset fans on the sides of the gas generator, and since the air inlet thereof is arranged in a space provided between the fans, this air inlet is liable to take in particles, also referred to as foreign bodies, such as sand, hail, birds or the like. Another drawback of this architecture is that the space between the two fan casings is sufficiently small to generate a sonic or even supersonic flow, which generates strong drag, impairing the efficiency of the propulsion assembly.

SUMMARY OF THE DISCLOSURE

An object of various embodiments of the present invention is to provide a propulsion assembly making it possible in particular to protect the gas generator from ingestion of particles while reducing the drag of the assembly.

This object is achieved by a propulsion assembly for an aircraft, comprising a gas generator and two fans driven in rotation by the gas generator and offset on either side of a vertical plane passing through the axis of the gas generator of said assembly, the propulsion assembly comprising an air inlet sleeve comprising an inlet pipe which is located substantially between the fans and oriented along a first axis that is substantially parallel and offset with respect to a longitudinal axis of the gas generator, the inlet pipe dividing into a supply pipe that is connected to an inlet opening of the gas generator and a discharge pipe configured such that particles ingested by the inlet pipe are discharged without entering the gas generator.

In the present description, the term "particles" is understood to mean foreign bodies such as sand, hail, birds or other elements capable of damaging the fan blades and the gas generator.

Thus this solution makes it possible to achieve the aforementioned object and/or others. In particular, this design of the propulsion assembly and specifically of the supply pipe for the gas generator that is oriented so as to follow an axis that is offset with respect to the inlet pipe makes it possible to set the air inlet of the gas generator out of alignment and therefore to protect it from particles or foreign objects that are able to be ingested by the air inlet sleeve. Any objects ingested are therefore directed towards the discharge pipe and discharged. The air inlet of the gas generator is therefore concealed and protected.

In accordance with one embodiment, the inlet pipe has a front section, of which a projection in the downstream direction in parallel with the longitudinal axis passes outside the perimeter of the inlet opening of the gas generator.

According to one embodiment, the two fans are contained in an aerodynamic fairing having an upper surface and a lower surface, and the front section of the inlet pipe is incorporated in an air inlet opening which extends between the two fans and between the upper surface and the lower surface of the fairing. In this way, this design makes it possible to fill this high-Machs inter-fan zone and also to reduce the drag.

According to another embodiment, the longitudinal axis of the gas generator passes inside the air inlet opening.

According to another embodiment, the air inlet opening extends on either side of the fan plane containing the rotational axes of the two fans.

According to one embodiment, the air inlet opening is formed in a single part.

According to another embodiment, the air inlet opening is formed by two parts distributed on either side of the fan plane and separated from each other by a wall.

According to another embodiment, the air inlet opening feeds air entering both the inlet pipe and a ventilation flow path from which the air for cooling the elements of the propulsion assembly and/or of a wing of the aircraft is taken. This ventilation flow path makes it possible to ventilate the "compartment" of the gas generator and to cool some of the accessories such as exchangers.

According to another embodiment, the ventilation flow path is delimited partly by a wall of the inlet pipe, said wall separating the airflow entering the ventilation flow path into ventilation flows passing along an external casing of the gas generator. In this way, each of the air inlet openings is in fluid communication with the ventilation flow path or the air inlet sleeve.

According to another embodiment, the discharge pipe comprises an inlet section which is divided downstream into two channels formed in order to circumvent suspension means of the gas generator.

According to another embodiment, the air inlet opening is curved so as to adapt to the circular design of the air inlet lips of the fan casings.

Advantageously, but in a non-limiting manner, the curved shape of the air inlet opening is an hour-glass shape or has rounded ends.

According to one embodiment, the air inlet lips of the fan casings are defined in the same plane.

Advantageously, but in a non-limiting manner, the air inlet lips of the fan casings are defined in planes that are offset axially and in parallel with one another so as to adapt to the sweep angle of the wing relative to an elongation axis of the fuselage.

Embodiments of the present invention also relate to a propulsion wing comprising a propulsion assembly having any of the preceding features in any combination, said assembly being suspended from the wings.

Embodiments of the present invention also relate to a propulsion wing comprising a propulsion assembly having any of the preceding features in any combination, the propulsion assembly being integrated in the wings.

BRIEF DESCRIPTION OF THE DRAWINGS

Embodiments of the present disclosure will be better understood and other aims, details, features and advantages thereof will emerge more clearly from reading the following detailed explanatory description of embodiments of the invention given by way of purely illustrative and non-limiting examples, with reference to the accompanying schematic drawings, in which.

DETAILED DESCRIPTION OF THE DISCLOSURE

Figure 1:
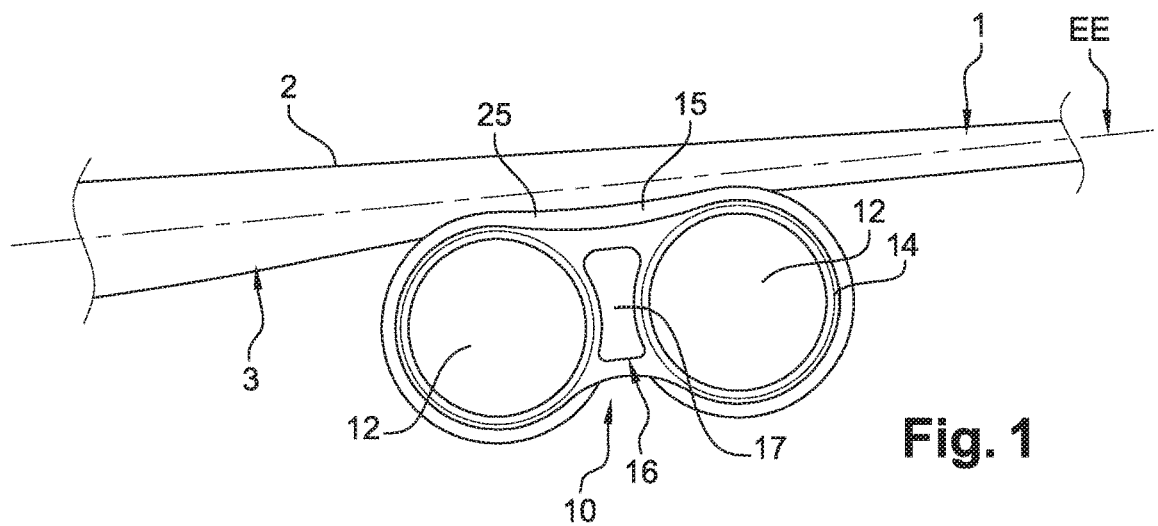
FIG. 1 is a partial front view of an aircraft wing supporting a propulsion assembly according to an aspect of the invention.

FIG. 1 is a partial view of a propulsion wing 1 or a lateral wing for the lift of an aircraft, and in particular of an aeroplane (not shown), the wing being inserted into a fuselage of the aircraft. This wing 1 extends in a span direction E-E from the fuselage and comprises a so-called upper suction surface 2 and a so-called lower pressure surface 3 that are opposite with respect to a plane comprising the span direction E-E. The pressure and suction surfaces 2, 3 are connected to each other by a leading edge 4 upstream and a trailing edge 5 downstream of the wing. In the present invention the terms "upstream" and "downstream" are defined with respect to the direction of travel of the aircraft.

A propulsion assembly 10 supported by each wing 1 comprises a gas generator 11 having a longitudinal axis X substantially parallel to the elongation axis of the fuselage, and two fans 12 with axes offset with respect to a vertical plane passing through the axis X of the gas generator 11. The fans 12 are arranged on either side of the gas generator 11. Preferably, but in a non-limiting manner, the axes of the fans are defined in the same plane substantially in parallel with the plane in which the span direction E-E is defined, that is to say the wing 1 of the aeroplane.

The fans 12 are separated from each other so as to allow installation of the gas generator 11 therebetween. The longitudinal axis X of the gas generator 11 may lie in the same plane as the axes of the fans or may be offset vertically with respect to the plane of the axes of the fans, which makes it possible to bring the fans 12 closer to each other.

In FIGS. 1 to 4 and 6, the gas generator 11 and the fans 12 are attached to the propulsion wing of the aircraft by means of a strut (not shown). To this end, the fans 12 are each arranged in a fan casing 14. The fans are driven via a power transmission mechanism (not shown) coupled to the shaft of the gas generator.

The gas generator 11 is housed in a casing 13 and comprises, from upstream to downstream, at least one inlet opening 11e, a compressor, a combustion chamber and a turbine. The casing ends downstream in a gas discharge pipe. It may be mono- or multi-flow, single- or multi-body, according to requirements. The casing of the gas generator has a roughly cylindrical shape. Moreover, the gas generator 11 may be arranged behind the fan casings or between the fan casings.

The top part of the casings 13, 14 is arranged substantially in the same plane. This design makes it possible to facilitate the attachment of the propulsion assembly to the wings. In the present invention, the terms "top", "upper", "lower" and "bottom" are defined with respect to a vertical direction, the aircraft generally being positioned so as to be substantially horizontal.

The propulsion assembly 10 comprises an air inlet fairing 15 having a front wall 16 provided with an air inlet opening 17 that extends between the fans 12. The front wall 16 is arranged between the fans 12 and upstream of the gas generator 11, in a plane transverse to the axis of the gas generator. Moreover, the front wall 16 may be symmetrical to a horizontal midplane which comprises the fan axes. The front wall may also be symmetrical to a vertical midplane passing between the two fans 12 with reference to FIGS. 1, 2, and 6.

Figure 2:
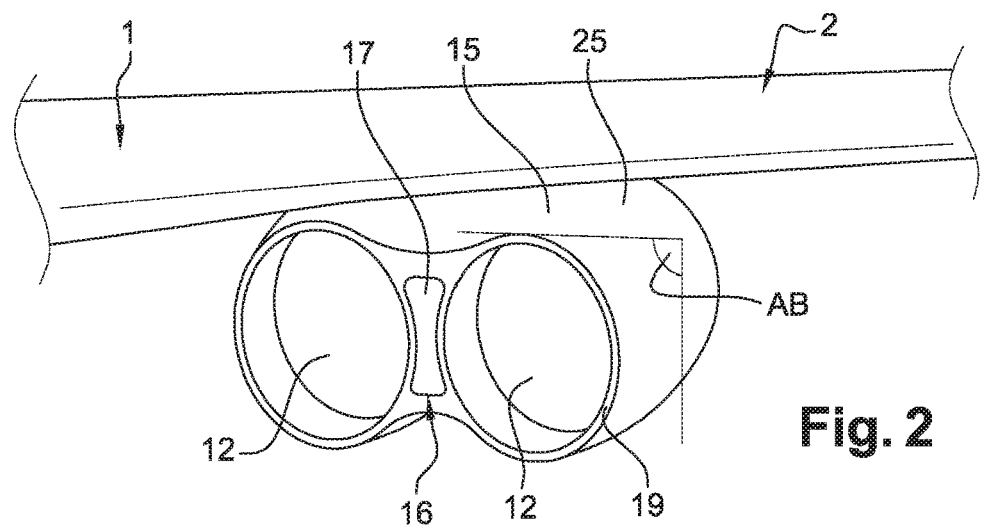
FIG. 2 is a perspective view of an embodiment of a propulsion assembly according to an aspect of the invention supported by a wing and comprising a nacelle.
Figure 3:
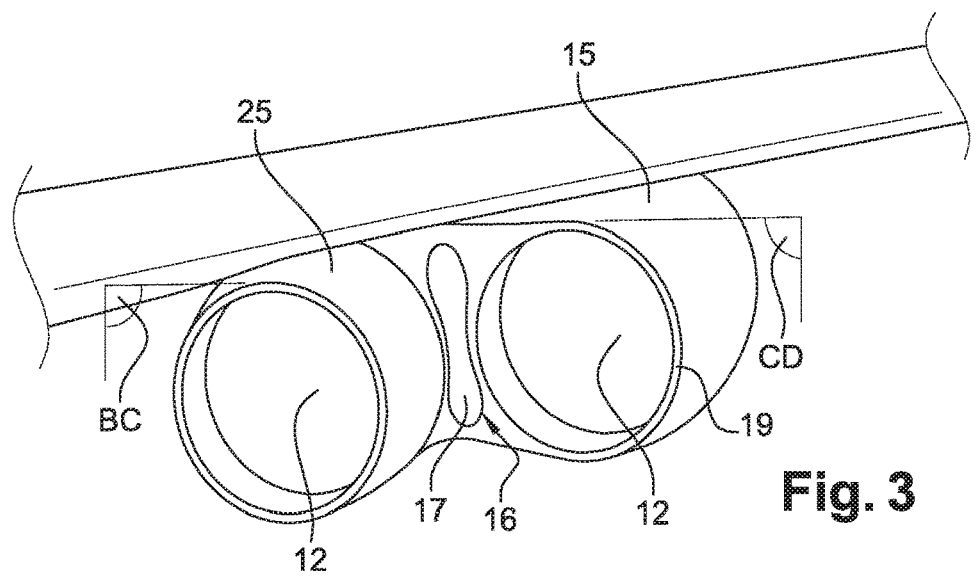
FIG. 3 is a perspective view of another embodiment of a propulsion assembly according to an aspect of the invention supported by a wing and comprising a nacelle.
Figure 12:
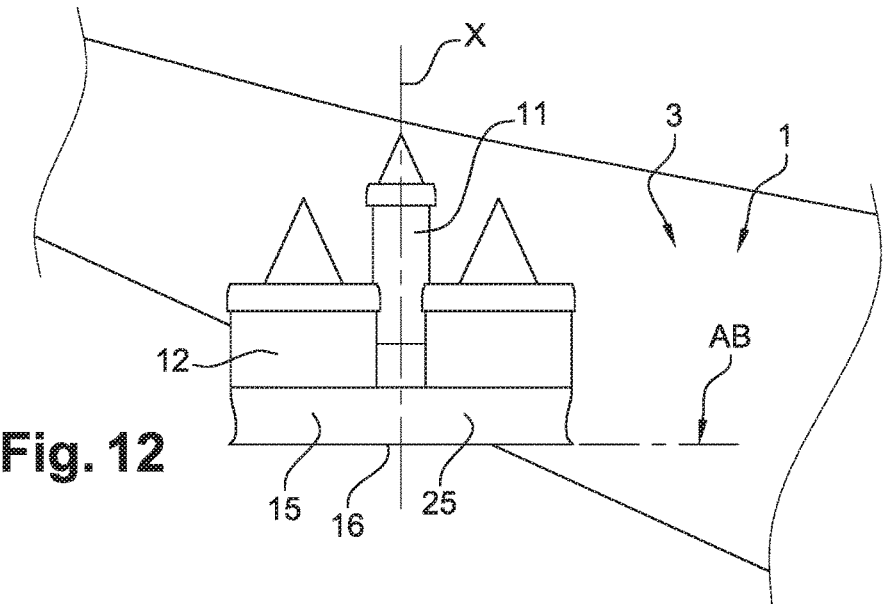
FIG. 12 is a view from below of a wing supporting a propulsion assembly according to an aspect of the invention.

More precisely, the propulsion assembly 10 comprises a nacelle 25 that comprises the air inlet fairing 15. The nacelle 25 advantageously, but in a non-limiting manner, encloses the upstream parts of the fans (see FIG. 12). In this example, the nacelle 25 carries the upstream parts of the fan casings 14 and the front wall 16 is upstream of the gas generator 11. Alternatively and as shown in FIGS. 2 and 3, the nacelle 25 forms an aerodynamic fairing entirely containing or enclosing the two fans and the gas generator, as well as the air inlet opening 17.

The air inlet opening 17 is configured to supply at least the gas generator 11. This air inlet opening 17 is arranged between the two fans 12 and extends over the entire height of the front wall 16. In other words, the air inlet opening extends on either side of the fan plane containing the rotational axes of the two fans. The air inlet opening is formed in a single part 17, as can be seen in FIGS. 1 to 3. Alternatively and with reference to FIG. 6, the air inlet opening, generally designated 17', is formed by two parts 17a, 17b distributed on either side of the fan plane and separated from each other by a wall 18. The axis X of the gas generator 11 passes inside the air inlet opening 17' or one of the air inlet opening parts 17a, 17b.

The air inlet opening 17 has a curved shape so as to at least partly match the shape of an inter-fan zone that is delimited by air inlet lips 19 surrounding the air inlets of the fan casings, which in this case are circular in cross section. In particular, the air inlet opening 17 has portions that are concave towards the inside, facing each other at the horizontal midplane. The curved shape of air inlet 17 may be an hourglass shape as shown in the embodiments of FIGS. 1 and 2 or may have rounded ends as shown in FIG. 3. Naturally, any other shape making it possible to adapt to the inter-fan zone can be envisaged.

In FIGS. 1, 2, 6, and 12, the air inlet lips 19 of the offset fans 12 are defined in the same plane AB, which in this case is perpendicular to the axis of the gas generator. The front wall 16 carrying the air inlet opening 17 is also defined in this plane AB.

In FIG. 3, the fans 12 are offset axially with respect to each other so as to follow the sweep angle of the wing of the aeroplane. In particular, the air inlet lips 19 of the offset fans 12 are defined in planes BC and CD that are offset axially with respect to each other. In this example, the planes BC and CD of the air inlet lips 19 are substantially parallel and perpendicular to the axis of the gas generator 11. The air inlet opening 17 of the front wall 16 is defined in the plane of the fan 12 which is located on the same side as the free end of the wing 1, that is to say furthest downstream.

Figure 4:
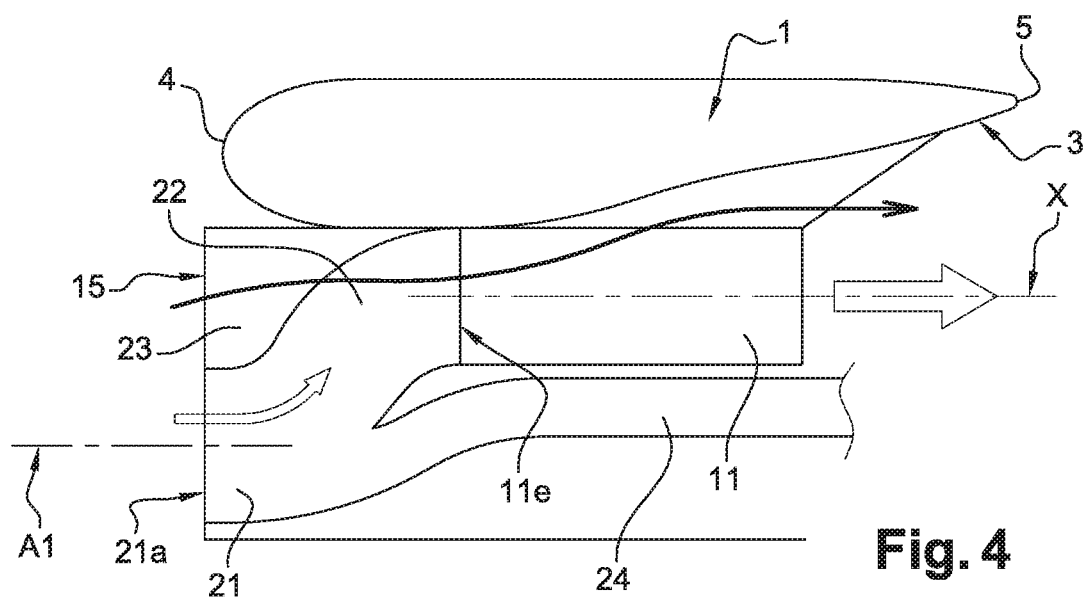
FIG. 4 is a schematic cross section through a propulsion assembly comprising an air inlet sleeve according to another embodiment of the invention.
Figure 5:
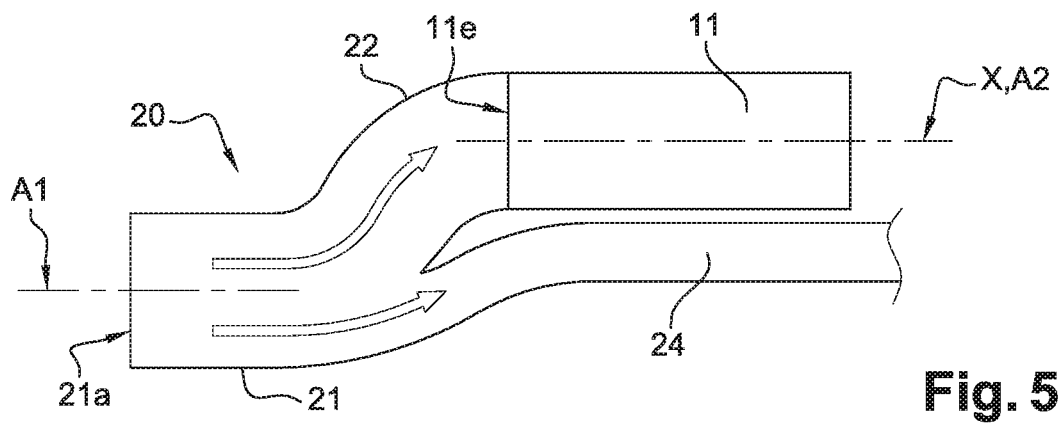
FIG. 5 is a schematic cross section through a propulsion assembly in which a supply pipe for the gas generator and a pipe for discharging foreign objects from an air inlet sleeve can be seen, according to another embodiment of the invention.

With reference to FIGS. 4 and 5, the propulsion assembly further comprises an air inlet sleeve 20 comprising an inlet pipe 21 and a supply pipe 22 for the gas generator 11 supplied by the inlet pipe 21. Said inlet pipe is oriented along a first axis A1 substantially parallel and offset with respect to the longitudinal axis X of the gas generator. The supply pipe 22 is connected to the inlet opening 11e of the gas generator 11 and is oriented along the axis X of the gas generator. The inlet pipe 21 has a front section 21a that is substantially perpendicular to the axis X of the gas generator. The projection of this front section 21a in the downstream direction, parallel to the longitudinal X axis, passes outside the perimeter of the inlet opening 11e of the gas generator. In other words, the inlet pipe 21 and the supply pipe 22 have an axial section in an S shape, the upstream end (front section 21a) of which is in fluid communication with the bottom part of the air inlet opening 17 and a downstream end of which is fluid communication with the inlet opening 11e of the gas generator. It is thus understood that the air inlet pipe 21 is located substantially between the two fans. Similarly, the front section 21a of the inlet pipe is located between the fans.

The air inlet sleeve 20 also comprises an air discharge pipe 24 for diverting particles or foreign objects ingested by the air inlet sleeve 20 to outside the supply pipe 22 for the gas generator 11. In this example, the inlet of the discharge pipe 24 is located below the air supply pipe 22, and the discharge pipe 24 axially extends under the gas generator 11.

The air inlet opening 17 is also in fluid communication with a ventilation flow path 23 which in this case extends on the two lateral sides of the gas generator 11, as well as above said generator while extending in the downstream direction. This ventilation flow path 23 is configured so as to cool equipment of the gas generator, for example hot fluid pipes and electronic housings, as well as volumetric or surface heat exchangers (not shown). In particular, the air supplied through the air inlet opening and circulating in this ventilation flow path 23 is taken off to cool elements of the propulsion assembly and discharged above the primary flow that passed through the gas generator 11 to thus form a fluid protection film specifically for an outer wall of the pressure surface 3 of the wing 1. This fluid film of fresh air protects the wing from excessive heat caused by the exhaust gases from the gas generator.

Figure 6:
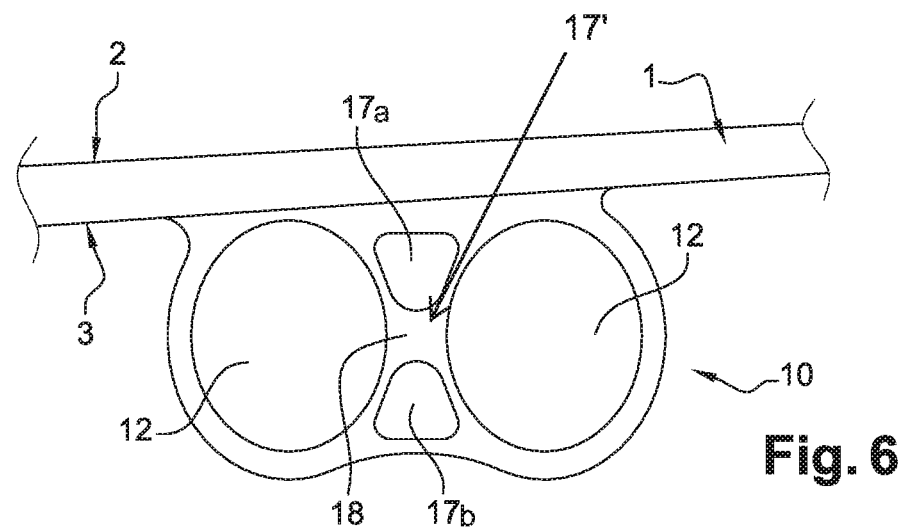
FIG. 6 is a schematic front view of another embodiment of the propulsion assembly according to an aspect of the invention.
Figure 13:
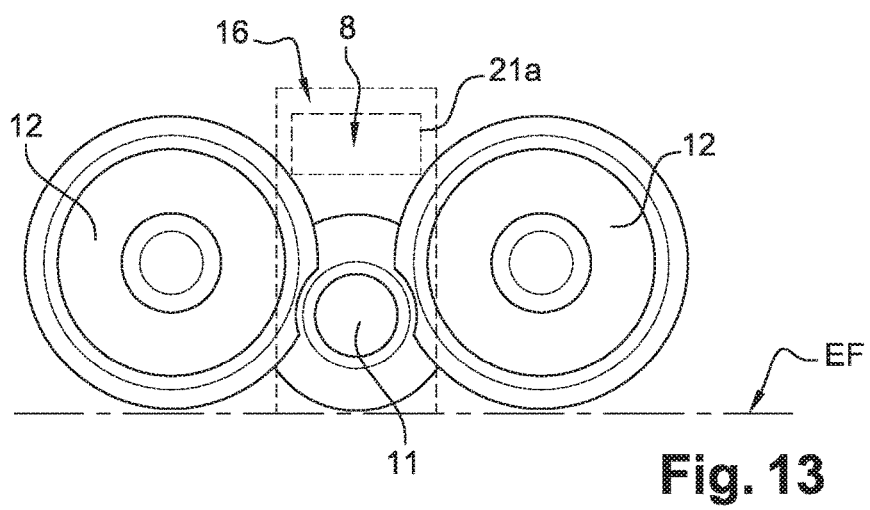
FIG. 13 is a front view of another embodiment of the propulsion assembly according to an aspect of the invention.

The ventilation flow path 23 is delimited partly by a wall of the inlet pipe 21, said wall separating the airflow entering the ventilation flow path 23 into ventilation flows passing along an external casing of the gas generator 11. With reference to FIG. 6, in which the front wall 16 comprises two air inlet opening parts 17, 17' separated from each other by a wall 18 formed by a middle part of the front wall 16, the bottom air inlet opening part 17 supplies the air inlet sleeve 20, and the top inlet opening part 17' is configured to supply the ventilation flow path 23. In this scenario, the top air inlet opening part 17' is located above the middle wall 18 while the bottom air inlet opening part 17 is located below this middle wall 18. Naturally, in another design of the propulsion assembly as is shown in FIG. 13, the bottom air inlet opening part 17 may be in fluid communication with the ventilation flow path, and the top air inlet opening part 17' in fluid communication with the air inlet sleeve 20, the gas generator 11 thus being arranged substantially below the fan plane of the propulsion assembly.

In FIGS. 7 to 11, the gas generator 11 and the fans 12 are integrated directly in the propulsion wing 1. The elements already described above that are identical or similar in the rest of the present description have the same reference numerals.

Figure 7:
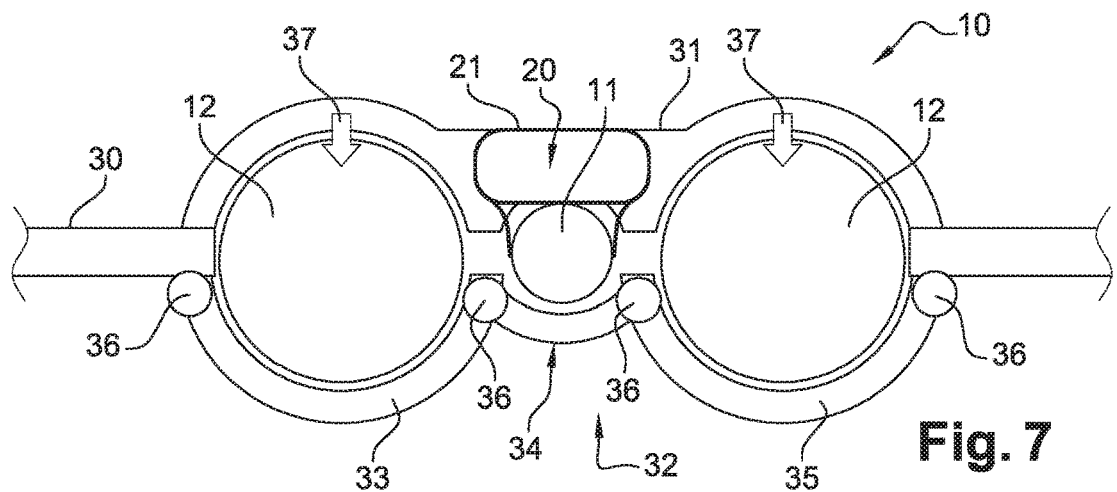
FIG. 7 is a schematic cross section through a propulsion assembly integrated in an aircraft wing according to another embodiment of the invention.
Figure 8:
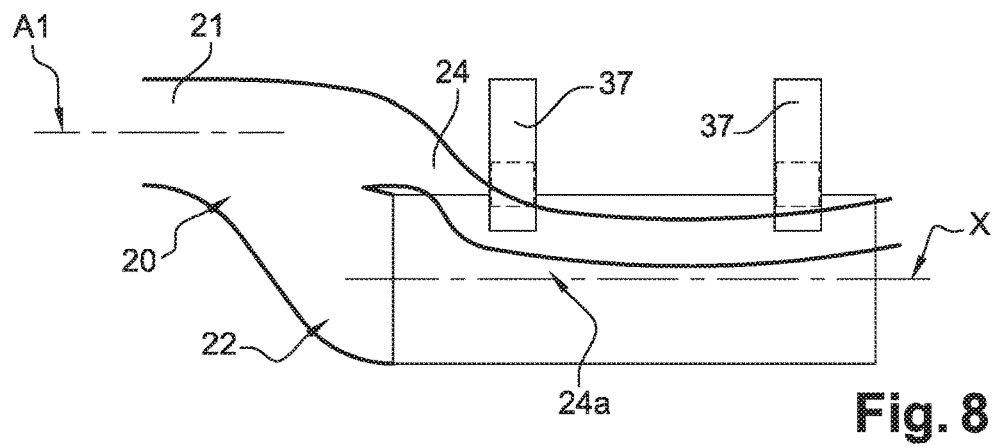
FIGS. 8 and 9 are schematic representations of the propulsion assembly illustrated in FIG. 7.
Figure 9:
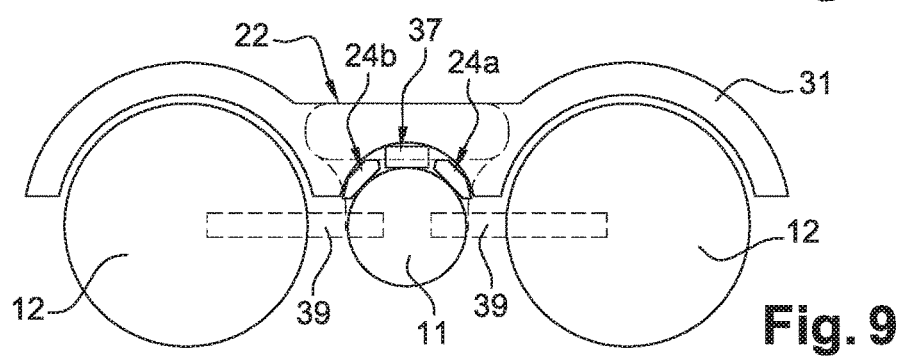

With reference to FIG. 7, each wing 1 comprises an upstream structural spar 30 and a downstream structural spar (not shown) each extending in the span direction E-E of the wing 1. At least one of the upstream and downstream spars is formed of a first part and a second part, which are, for example, substantially rectilinear and interconnected by a rigid structure 31. This rigid structure 31 can be formed solely by a top structure of the wing so as to facilitate access to the propulsion assembly and to make it possible to remove said assembly via the bottom of the wing. In this case, the two spars each comprise first and second parts that are separate and distinct and interconnected by the rigid structure 31. The gas generator and the fans offset on either side of the gas generator are at least partly attached to this top structure 31 via suspension means 37 (FIGS. 8 and 9). Therefore, the propulsion assembly 10 is arranged between the first and the second parts in the span direction of the wing 1. The top structure 31 surrounds the top part of the gas generator 11 and the fans 12. For this purpose, the top structure 31 is curved so as to adapt in part to the profile of the gas generator 11 and the fans 12. Consequently, each wing is separated into two parts along its span by the propulsion assembly.

A bottom structure 32 is arranged in the bottom part of the upstream and downstream spars 30. The bottom structure 32 comprises three parts 33, 34, 35 which can form cowls and comprise frames that are articulated to the wing by means of articulated joints 36 which may also constitute locking devices, the pivot axes of which are substantially parallel to the axis of the gas generator. The lateral cowls 33, 35 can also be articulated to one of the first and second parts, respectively, of at least one of the spars so as to easily and rapidly access the propulsion assembly 10 and ensure maintenance operations can be carried out. This bottom structure 32, and in particular the frames of the cowls 33, 34, 35, can also assist the top rigid structure 31 to route some of the forces between the first and second parts of the upstream and downstream spars. The bottom structure 32 comprises a portion of the skin forming the pressure side of the wing 1. The bottom structure 32 thus forms bottom outer aerodynamic lines for the fans and the gas generator. The top structure 31, for its part, is covered with a skin made of sheet metal or of composite forming the suction surface 3 of the wing 1. In the vertical direction with reference to FIGS. 7, 10, and 11, the propulsion assembly 10 is arranged between the pressure surface and the suction surface of the wing which form the aerodynamic fairing of said assembly.

The front wall 16 extends into the inter-fan zone. The air inlet opening 17 in this case extends between the pressure surface and the suction surface which form the aerodynamic fairing. The air inlet opening 17 formed in this front wall is in fluid communication with the air inlet sleeve 20, the inlet pipe 21 of which having the first axis A1 is located in the top part of the air inlet opening 17 and above the axis of the gas generator 11. The first axis A1 and the axis X of the gas generator are therefore out of alignment and at a distance from one another, as shown in FIG. 8.

With reference to FIGS. 8 and 9, the pipe 24 for discharging particles from the air inlet sleeve 20 comprises an inlet section which is divided in the downstream direction of the propulsion assembly 10 into two discharge channels 24a, 24b. The discharge channels 24a, 24b are formed in order to circumvent a suspension, suspension assembly, or suspension means 37 of the gas generator 11. As can be seen in FIG. 9, the discharge channels 24a, 24b pass on either side of the suspension means 37 of the gas generator 11 and into the top part thereof. The cross section of the channels on either side of the suspension means 37 is locally formed so as to take up most of the radial space between an outer casing of the gas generator and the top structure 31. Advantageously, the evacuation channels 24a, 24b extend above the transmission shafts 39 of a power transmission mechanism.

Figure 10:
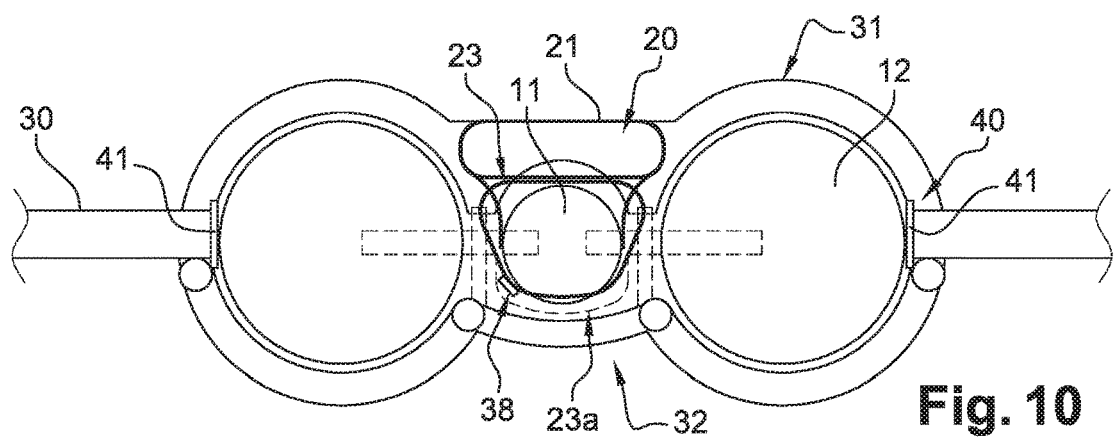
FIG. 10 is a schematic cross section though a propulsion assembly according to an aspect of the invention, integrated in an aircraft wing.
Figure 11:
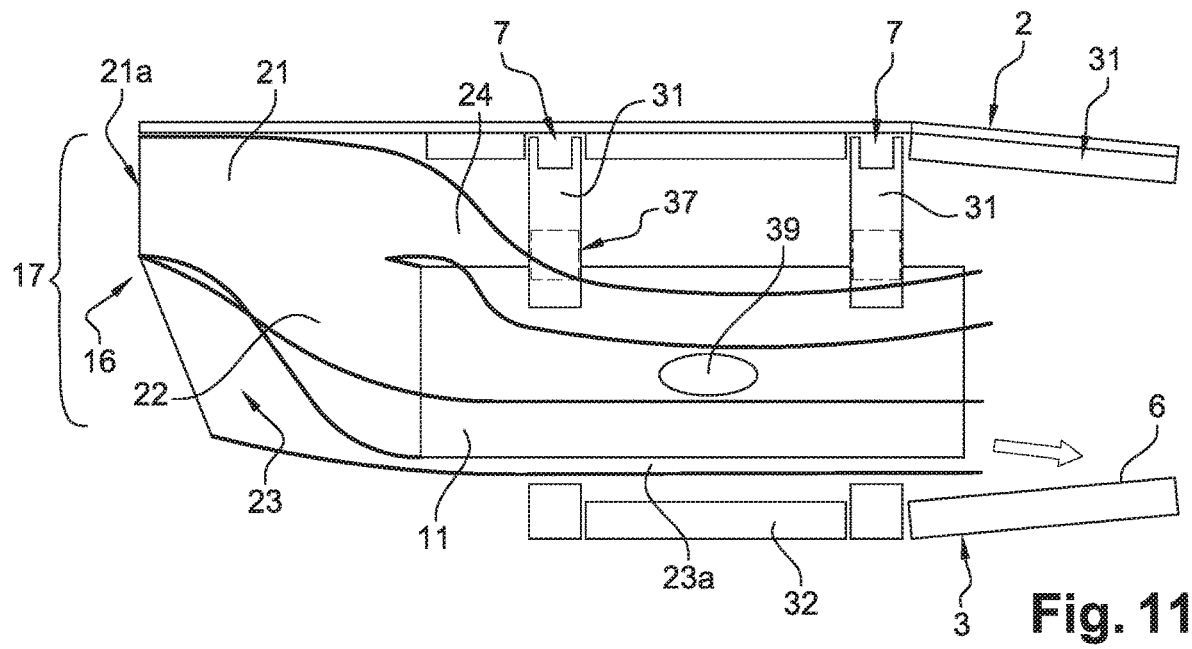
FIG. 11 is an axial sectional view of the embodiment in FIG. 10.

With reference to FIGS. 10 and 11, the air inlet opening 17 also communicates with a ventilation flow path 23, the inlet opening of which is located below the inlet pipe 21 of the air inlet sleeve 20. In this example, this ventilation flow path 23 is divided in the downstream direction into two ventilation channels 23a so as to circumvent the supply pipe 22. The ventilation channels 23a extend into the bottom part of the gas generator 11, essentially below the level of the transmission shafts 39, as can be seen in FIG. 11, in order to cool equipment for example arranged on an outer casing of the gas generator, such as equipment 38 shown schematically in FIG. 10. Equipment 38 can consist for example in an air/oil surface exchanger comprising cooling fins. The air circulating in the ventilation flow path 23 is discharged below the primary flow that passed through the gas generator 11 and thus forms a fluid protection film, in particular for an inner wall 6 of the pressure surface 3 of the wing 1.

One or more shields of shielding means 40 are integrated on either side of the propulsion assembly 10 so as to protect the equipment installed in the wing, in particular to protect fuel tanks if a disc of the gas generator were to burst. These shielding means comprise a shielding plate which forms a cross member 41 which passes through the wing 1 from its leading edge 4 to its trailing edge 5. Easement passages 7 for equipment installed in the wing 1 are provided above the top structure 31 for the protection thereof.

According to another embodiment, as shown in FIG. 13, the gas generator 11 is supported upstream by the fan casings. The fans 12 are supported by the propulsion wing 1, either by integration in the wing or by suspension thereof from the wing, which can be achieved by means of a strut. In this example, the EF plane that is tangent to the bottom parts of the fans 12 is also substantially tangent to the bottom part of the gas generator 11. Said gas generator is supplied by the supply pipe 22 and the S-shaped inlet pipe 21 of the air inlet sleeve 20. The inlet pipe 21, and in particular its front section 21a, are located in the top part of the air inlet opening 17.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A propulsion assembly of an aircraft, comprising: a gas generator and two fans driven in rotation by the gas generator and offset on either side of a vertical plane passing through a longitudinal axis of said gas generator; an air inlet sleeve comprising an inlet pipe which is located substantially between the fans and oriented along a first axis that is substantially parallel and offset with respect to the longitudinal axis of the gas generator, the inlet pipe dividing into a supply pipe that is connected to an inlet opening of the gas generator and a discharge pipe configured such that particles ingested by the inlet pipe are discharged without entering the gas generator, wherein the inlet pipe has a front section, of which a projection in the downstream direction in parallel with the longitudinal axis passes outside the perimeter of the inlet opening of the gas generator.

2. The propulsion assembly according to claim 1, wherein the two fans are contained in an aerodynamic fairing having an upper surface and a lower surface, and the front section of the inlet pipe is incorporated in an air inlet opening which extends between the two fans and between the upper surface and the lower surface of the fairing.

3. The propulsion assembly according to claim 2, wherein the longitudinal axis of the gas generator passes inside the air inlet opening.

4. The propulsion assembly according to claim 2, wherein the air inlet opening extends on either side of a fan plane containing the rotational axes of the two fans.

5. The propulsion assembly according to claim 3, wherein the air inlet opening is formed in a single part.

6. The propulsion assembly according to claim 4, wherein the air inlet opening is formed by two parts distributed on either side of the fan plane and separated from each other by a wall.

7. The propulsion assembly according to claim 2, wherein the air inlet opening feeds air entering both the inlet pipe and a ventilation flow path from which the air for cooling the propulsion assembly or of a wing of the aircraft is taken.

8. The propulsion assembly according to claim 7, wherein the ventilation flow path is delimited partly by a wall of the inlet pipe, said wall separating the airflow entering the flow path into ventilation flows passing along an external casing of the gas generator.

9. The propulsion assembly according to claim 1, wherein the discharge pipe comprises an inlet section which is divided downstream into two channels formed in order to circumvent a suspension of the gas generator.

10. A propulsion wing comprising the propulsion assembly according to claim 1, which is suspended from the wing.

11. A propulsion wing comprising the propulsion assembly according to claim 1, which is integrated in the wing.

12. The assembly according to claim 2, wherein the air inlet opening is curved.

13. The assembly according to claim 12, wherein the curved shape of the air inlet opening is an hour-glass shape or has rounded ends.

14. The assembly according to claim 1, wherein each of the two fans of the assembly comprises a fan casing and each of the fan casings has air inlet lips which are defined in a geometrical plane, both geometrical planes of said inlet lips being in the same geometrical plane.

15. The assembly according to claim 10, wherein each of the two fans of the assembly comprises a fan casing and the fan casings have air inlet lips which are defined in geometrical planes that are axially offset and parallel to each other so as to adapt to a sweep angle of the wing relative to an elongation axis of a fuselage.

* * * * *